United States Patent
Lee

(10) Patent No.: US 10,021,311 B2
(45) Date of Patent: Jul. 10, 2018

(54) CAMERA CONTROL APPARATUS

(71) Applicant: HANWHA TECHWIN CO., LTD., Changwon-si (KR)

(72) Inventor: Hyun Jin Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 229 days.

(21) Appl. No.: 14/509,230

(22) Filed: Oct. 8, 2014

(65) Prior Publication Data

US 2015/0350556 A1 Dec. 3, 2015

(30) Foreign Application Priority Data

May 29, 2014 (KR) ........................ 10-2014-0065108

(51) Int. Cl.
*H04N 5/232* (2006.01)
*G08B 13/196* (2006.01)

(52) U.S. Cl.
CPC ... *H04N 5/23296* (2013.01); *G08B 13/19608* (2013.01); *H04N 5/232* (2013.01); *H04N 5/23219* (2013.01); *H04N 5/23261* (2013.01); *H04N 5/23251* (2013.01); *H04N 5/23254* (2013.01)

(58) Field of Classification Search
CPC .... H04N 5/23296; H04N 5/145; H04N 5/144; G06K 9/00771; G06K 9/00335; G06T 7/20; G08B 13/19602; G08B 13/19608
See application file for complete search history.

(56) References Cited

U.S. PATENT DOCUMENTS

| 5,111,288 A * | 5/1992 | Blackshear | G08B 13/19619 348/143 |
| 6,215,519 B1 * | 4/2001 | Nayar | G08B 13/19608 348/148 |
| 6,359,647 B1 * | 3/2002 | Sengupta | G08B 13/19608 348/143 |

(Continued)

FOREIGN PATENT DOCUMENTS

| JP | 2008-252331 A | 10/2008 |
| KR | 10-2002-0015637 A | 2/2002 |

(Continued)

OTHER PUBLICATIONS

Mohammed A. Taha & Sharief F. Babiker, Object Video Tracking using a Pan-Tilt-Zoom System, 4 University of Khartoum Engineering J. 12, 13-19 (Feb. 2014).*

(Continued)

*Primary Examiner* — David N Werner
(74) *Attorney, Agent, or Firm* — Sughrue Mion, PLLC

(57) ABSTRACT

A camera control apparatus is provided. The camera control apparatus includes: a processor configured to detect a partial image including an object from a first image of a camera, generate a control value for controlling a camera capturing area to position a specific point of the object corresponding to specific coordinates of the partial image on center coordinates of a second image of the camera which is captured by the camera subsequent to the first image based on center coordinates of the partial image and center coordinates of the first image; and a camera drive controller configured to change the camera capturing area based on the control value output from the processor.

16 Claims, 12 Drawing Sheets

(56) References Cited

U.S. PATENT DOCUMENTS

| | | | | |
|---|---|---|---|---|
| 2004/0119819 | A1* | 6/2004 | Aggarwal | G06K 9/00771 348/143 |
| 2005/0073585 | A1* | 4/2005 | Ettinger | H04N 7/18 348/155 |
| 2006/0126737 | A1* | 6/2006 | Boice | G01S 3/7862 375/240.16 |
| 2007/0291104 | A1* | 12/2007 | Petersen | G01S 3/7865 348/14.01 |
| 2009/0102924 | A1* | 4/2009 | Masten, Jr. | G08B 13/19608 348/155 |
| 2010/0026809 | A1* | 2/2010 | Curry | H04N 7/183 348/157 |
| 2010/0265394 | A1* | 10/2010 | Yamano | H04N 19/533 348/452 |
| 2010/0329582 | A1* | 12/2010 | Albu | G06T 5/003 382/255 |
| 2012/0020524 | A1* | 1/2012 | Ishikawa | H04N 7/183 382/103 |
| 2013/0070091 | A1* | 3/2013 | Mojaver | H04N 5/2258 348/143 |

FOREIGN PATENT DOCUMENTS

| | | |
|---|---|---|
| KR | 10-2008-0009878 A | 1/2008 |
| KR | 10-2010-0104194 A | 9/2010 |
| KR | 10-1111503 B1 | 2/2012 |
| KR | 10-1136366 B1 | 4/2012 |
| KR | 10-2013-0031016 A | 3/2013 |

OTHER PUBLICATIONS

"Computer." Merriam-Webster.com. 2016. http://www.merriam-webster.com (Accessed on Jul. 6, 2016).*

* cited by examiner

CAMERA CONTROL APPARATUS

CROSS-REFERENCE TO RELATED APPLICATION

This application claims priority from Korean Patent Application No. 10-2014-0065108, filed on May 29, 2014 in the Korean Intellectual Property Office, the disclosure of which is incorporated herein in its entirety by reference.

BACKGROUND

1. Field

Apparatuses and methods consistent with exemplary embodiments relate to a camera control apparatus which makes an object included in a camera image acquired by capturing an image of a monitoring area be positioned in a center of the camera image.

2. Description of the Related Art

A pan-tilt-zoom (PTZ) camera is used to accurately capture an image of an object in a monitoring area.

The PTZ camera includes pan, tilt, zoom, and focus functions to track an object through a movement of a camera or to enlarge or precisely capture an image of the object.

However, since the PTZ camera in the related art tracks or precisely captures the image of the object through execution of any one of pan, tilt, zoom, and focus functions after forming a camera image that is acquired by capturing the image of the monitoring area, a delay phenomenon occurs in tracking the object due to the performing of the tracking after capturing the image of the object.

Accordingly, due to the delay phenomenon in tracking the object as described above, the object included in the camera image is positioned at a point that secedes from the center of the camera image.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above One or more exemplary embodiments include a camera control apparatus, which makes an object included in a camera image acquired by capturing an image of a monitoring area be positioned in a center of the camera image.

Various aspects will be set forth in part in the description which follows and, in part, will become apparent to those having ordinary skill in the art upon examination of the following or may be learned from practice of the exemplary embodiments.

According to an aspect of an exemplary embodiment, there is provided a camera control apparatus including: a processor configured to detect a partial image including an object from a first image of a camera, generate a control value for controlling a camera capturing area to position a specific point of the object corresponding to specific coordinates of the partial image on center coordinates of a second image of the camera which is captured by the camera subsequent to the first image based on center coordinates of the partial image and center coordinates of the first image; and a camera drive controller configured to change the camera capturing area based on the control value output from the processor.

The processor may include an image reception module configured to receive a camera image in a frame unit; a target detection module configured to detect the partial image through a user's selection or a predetermined image detection process; a control value calculation module configured to determine control center coordinates for the camera capturing area as a specific point in an opposite direction to the center coordinates of the partial image based on a difference between the center coordinates of the partial image and the center coordinates of the first image, change a weight of a control acceleration for changing the camera capturing area according to a difference between the center coordinates of the partial image and the control center coordinates, and to generate the control value based on the changed weight; and a control execution module configured to output the control value to the camera drive controller.

The camera control apparatus may further include an input unit to select the partial image.

The control value calculation module is configured to determine whether a speed reduction pattern of an acceleration of the object exists, and set a camera speed reduction section before a stop expectation point of the object if it is determined that the speed reduction pattern exists.

If it is determined that the speed reduction pattern does not exist, the control value calculation module is configured to set the camera speed reduction section based on a stop point of the object during a stop or direction change of the object, and set to move camera in a reverse direction at a predetermined reference speed as long as a distance between the center coordinates of the second image and the specific point of the object.

If a plurality of objects exist in the first camera image, the target detection module is configured to select any one of the plurality of objects by a user selection.

If a plurality of objects exist in the first camera image, the target detection module is configured to automatically select any one of the plurality of objects based on a predetermined selection priority, in which an object having high possibility of seceding from a monitoring area is set as a priority object.

The control value calculation module is further configured to include parameters for applying a field of view (FOV) value corresponding to a zoom magnification of the second image to the weight change of the control acceleration.

According to an aspect of another exemplary embodiment, there is provided a method of controlling a camera control apparatus including: receiving a camera image in a frame unit from a camera; detecting a partial image including an object from a first image of a camera; generating a control value for controlling a camera capturing area to position a specific point of the object corresponding to specific coordinates of the partial image on center coordinates of a second image of the camera which is captured by the camera subsequent to the first image based on center coordinates of the partial image and center coordinates of the first image; and changing the camera capturing area based on the generated control value.

Accordingly to an aspect of another exemplary embodiment, there is provided a non-transitory computer readable medium having recorded thereon a program, which, when executed by a computer, performs above-recited method.

BRIEF DESCRIPTION OF DRAWINGS

The above and/or other aspects will be more apparent from the following detailed description of the exemplary embodiments, taken in conjunction with the accompanying drawings, in which.

DETAILED DESCRIPTION OF EXEMPLARY EMBODIMENTS

Figure 1:
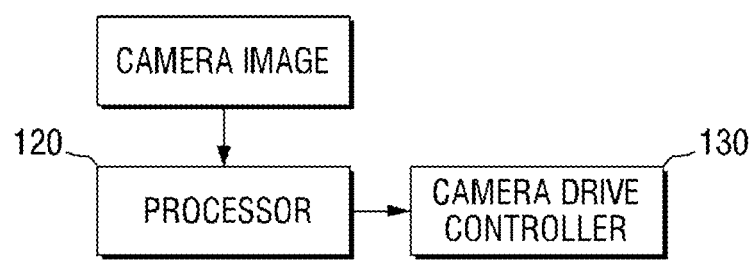
FIG. 1 is a block diagram illustrating a camera control apparatus according to an exemplary embodiment.

Hereinafter, various exemplary embodiments will be described in detail with reference to the accompanying drawings. The matters defined in the description, such as detailed construction and elements, are provided to assist in a comprehensive understanding of the exemplary embodiments. Thus, it is apparent that the exemplary embodiments can be carried out without those specifically defined matters. Like reference numerals refer to like elements throughout the specification.

The terminology used herein is describing the exemplary embodiments and is not intended to limit the inventive concept. As used herein, the singular terms "a", "an" and "the" are intended to include the plural forms as well, unless otherwise specified. It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers. As used herein, the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. In other words, the device may be otherwise reoriented (e.g., rotated 90 degrees or at other orientations) and the spatially relative descriptors used herein interpreted accordingly.

Exemplary embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, the exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is a block diagram illustrating a camera control apparatus according to an exemplary embodiment.

Referring to FIG. 1, a camera control apparatus 100 is so configured that an object included in a camera image acquired by capturing an image of a monitoring area be always positioned in the center of the camera image, and thus can greatly reduce the possibility that an object positioned at an edge of the camera image is lost due to a non-reaction to an abrupt speed change of the object or the like.

In addition, it is preferable, but not necessary, that the camera control apparatus 100 is configured so as to remove a screen vibration phenomenon that occurs in the center portion of the camera image due to inertia of movement of a camera that is caused by a camera stop when the object being tracked is stopped or changes its direction after controlling the movement of the camera through increasing of the moving speed of the camera to make the object be always positioned in the camera image.

The camera control apparatus 100 may include a processor 120 and a camera drive controller 130.

For the purpose of efficiently tracking an object in a monitoring area, a camera (not illustrated) that interlocks with the camera control apparatus 100 may be provided as a PTZ camera having pan, tilt, zoom, and focus functions.

The processor 120 detects a partial image including the object from a first image of the camera provided from the camera, and generates a control value for positioning a specific point of the object corresponding to specific coordinates of the detected partial image on the center coordinates of a second image of the camera which is captured by the camera subsequent to the first image.

The partial image including the object may be detected from the first image by a user's selection or through a predetermined image detection process.

The partial image including the object may be automatically detected from the first image through the predetermined image detection process without user's participation.

For example, a camera image of a current frame and a camera image of a previous frame may be compared with each other, a cell area including an object as a target of observation may be specified based on different points between the images as a result of comparison, and a specific cell area may be determined as the partial image as described above.

As another example, a face recognition algorithm may be executed with respect to a camera image of the current frame, a cell area including an object as a target of observation may be specified based on a result of the face recognition, and a specific cell area may be determined as the partial image as described above.

The processor 120 and the camera drive controller 130 may be integrally provided with the camera or may be provided as a separate configuration from the camera.

If the processor 120 is provided as a separate configuration from the camera, a control of a single camera may be performed in direct interlocking with the camera through a wired or wireless connection, and a control of a plurality of cameras may be performed through network connections (e.g., home network, Internet, and heterogeneous network) with the plurality of cameras including the camera.

The camera drive controller 130 changes a capturing area of the camera based on the control value output from the processor 120.

Figure 2:
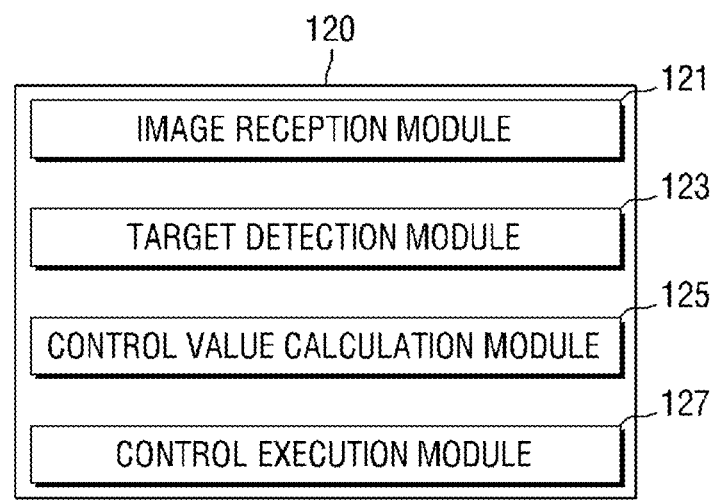
FIG. 2 is a block diagram illustrating a configuration of a processor shown in FIG. 1, according to an exemplary embodiment.

FIG. 2 is a block diagram illustrating a configuration of the processor 120 shown in FIG. 1.

Referring to FIG. 2, the processor 120 may include an image reception module 121 configured to receive a camera image in a frame unit from the camera, a target detection module 123 configured to detect a partial image from a first image of the camera through a predetermined image detection process, a control value calculation module 125 configured to determine a specific point of the first image corresponding to the center coordinates of the partial image based on the center coordinates of the first image as control center coordinates of the camera, to change a weight of a control acceleration for movement control of the camera according to a difference between the center coordinates of the partial image and the control center coordinates of the camera, and to generate the control value for movement of the camera based on the changed weight, and a control execution module 127 configured to output the generated control value to the camera drive controller 130.

Figure 3:
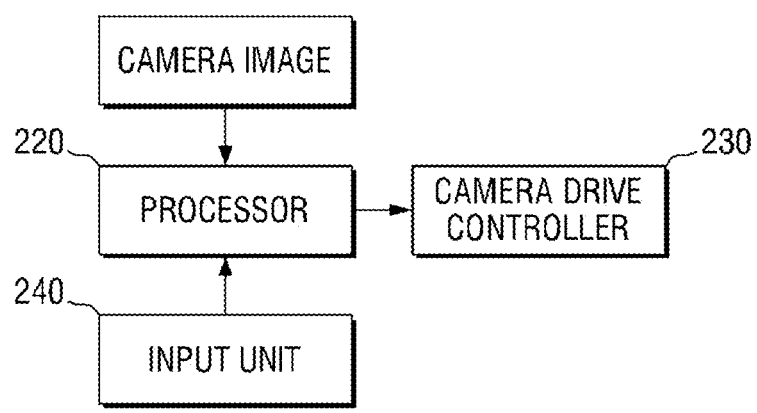
FIG. 3 is a block diagram illustrating a camera control apparatus according to an exemplary embodiment.

FIG. 3 is a block diagram illustrating a camera control apparatus 200 according to an exemplary embodiment.

Referring to FIG. 3, the camera control apparatus 200 may include an input unit 240, a processor 220, and a camera drive controller 230.

The input unit 240 may enable a user to select a partial image including an object from a camera image.

The processor 220 detects a partial image including the object from a first image provided from the camera through a user setting signal that is transferred from the input unit 240, and generates a control value for positioning a specific point of the object corresponding to specific coordinates of the partial image on the center coordinates of a second image of the camera which is captured by the camera subsequent to the first image.

The detection of the partial image from the first image through a user's selection is performed by selecting a specific point at which the object is positioned from the first image through a user's touch or a user input means, such as a cursor, and designating a surrounding group cell around the selected specific point in the unit of a predetermined cell to detect the partial image.

Figure 4:
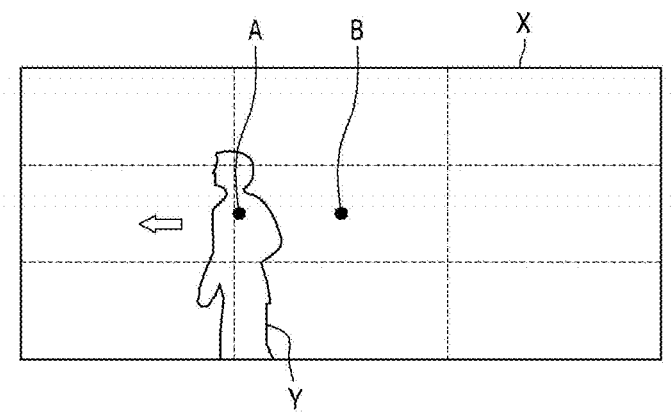
FIG. 4 is a diagram illustrating a camera image captured by a camera, according to an exemplary embodiment.

FIG. 4 is a diagram illustrating a camera image captured by a camera.

The camera image illustrated in FIG. 4 is a first image of the camera that is a line input of camera image for each frame provided from the camera. Here, a cell area in which the object is positioned among the first image may be a partial image.

As illustrated in FIG. 4, the center coordinates B of the first image and the center coordinates A of the partial image detected from the first image are positioned at different points in the first image, and thus do not coincide with each other.

In this case, the camera control apparatus 100 operates to make a specific point of the object corresponding to the center coordinates A of the partial image be positioned on the center coordinates of the second image corresponding to the subsequent frame.

Although it is preferable to make the specific point of the object corresponding to the center coordinates A of the partial image be positioned on the center coordinates of the second image, it is also possible to make a specific point of the object corresponding to specific coordinates (not illustrated) of the partial image, which is not the center coordinates A of the partial image, be positioned on the center coordinates of the second image.

Figure 5:
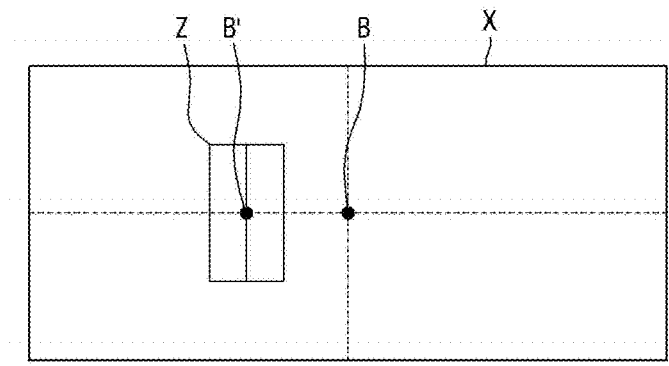
FIG. 5 is an exemplary diagram illustrating an image screen in the process of moving an object in the camera image of FIG. 4 to the center of a screen, according to an exemplary embodiment.

FIG. 5 is an exemplary diagram illustrating an image screen in the process of moving an object in the camera image of FIG. 4 to the center of a screen.

As illustrated in FIG. 5, in order to make the specific point of the object corresponding to the center coordinates A of the partial image be positioned on the center coordinates of the second image, the processor 120 gives a weight that makes the control acceleration for movement control of the camera exceed an acceleration of the object to the control acceleration of the camera. According to the movement control of the camera, the center coordinates B' of the second image may be directed to the specific point of the object corresponding to the center coordinates A of the partial image that is an image capturing area different from the center coordinates B of the first image.

Figure 6:
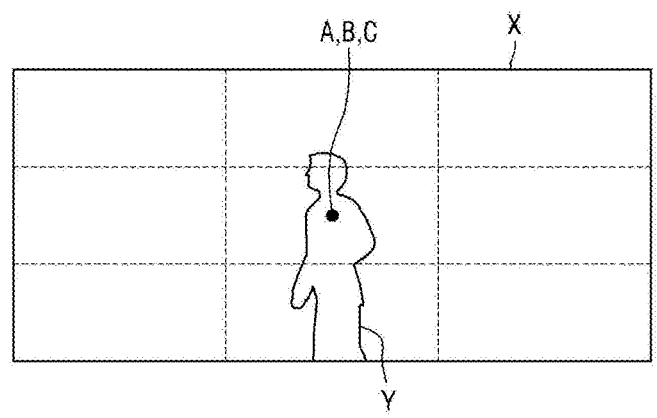
FIGS. 6 to 8 are exemplary diagrams illustrating the image screen of FIG. 5 by time zones.
Figure 7:
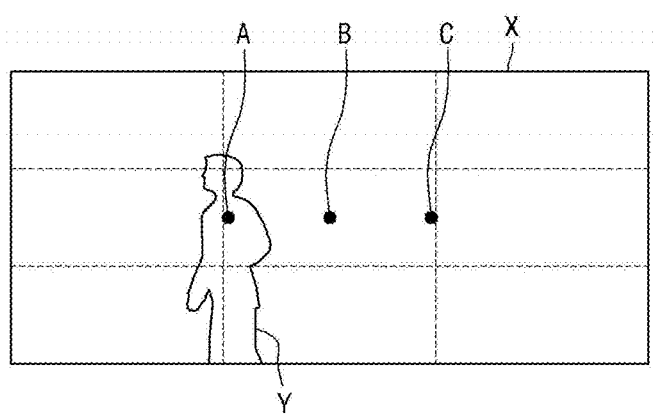
Figure 8:
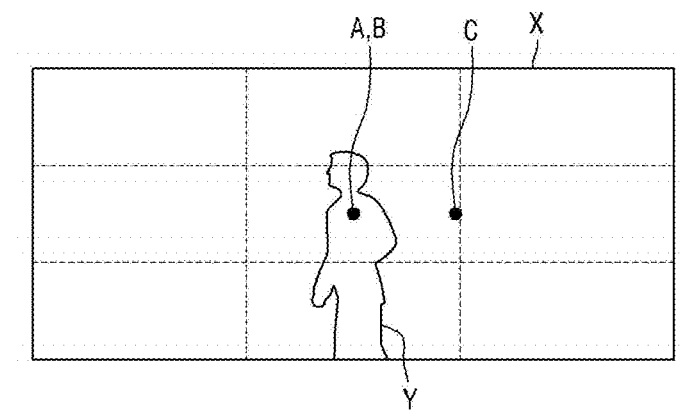

FIGS. 6 to 8 are exemplary diagrams illustrating the image screen of FIG. 5 by time zones. FIG. 6 shows a camera image of a frame at time "t", FIG. 7 shows a camera image of a frame at time "t+1", and FIG. 8 shows a camera image of a frame at time "t+2".

Referring to FIG. 6, since the center coordinates A of the partial image including the object in the first image coincide with the center coordinates B of the first image, a separate control for positioning the object in the center of the screen is not required. That is, if the first image is as illustrated in FIG. 6, control center coordinates C of the camera is same as the center coordinates A of the partial image and the center coordinates B of the first image, and thus the second image that is a subsequent frame is same as the first image. However, if the object in the first image is moving, the camera for tracking the object moves at the same control acceleration as the acceleration of the object, and the degree of a background screen in the second image is different from the degree of a background screen in the first image.

Referring to FIG. 7, since the center coordinates A of the partial image including the object in the first image are different from the center coordinates B of the first image, a separate control for positioning the object in the center of the screen is required. That is, if the first image is as illustrated in FIG. 7, the control center coordinates C of the camera may be determined as a specific point in an opposite direction to the center coordinates A of the partial image based on the center coordinates B of the first image.

Further, the processor 120 may determine the acceleration of the object using the distance between the center coordinates A of the partial image and the center coordinates B of the first image, and may determine the control acceleration of the camera using the distance between the center coordinates A of the partial image and the control center coordinates C of the camera. If the acceleration of the object using the distance between the center coordinates A of the partial image and the center coordinates B of the first image is "a", the control acceleration of the camera using the center coordinates A of the partial image and the control center coordinates C of the camera becomes "2a". That is, since the control acceleration "2a" of the camera is higher than the acceleration (i.e., "a") of the object, the control speed of the camera may be set to be higher than the moving speed of the object to make the object be positioned in the center of the camera as illustrated in FIG. 8.

As illustrated in FIG. 8, if the specific point A of the object corresponding to the specific coordinates of the partial image is positioned on the center coordinates B of the second image, the processor 120 changes the control acceleration of the camera from "2a" to "a". Through this, the processor 120 maintains the control acceleration of the camera and the acceleration of the object equal to each other.

Figure 9:
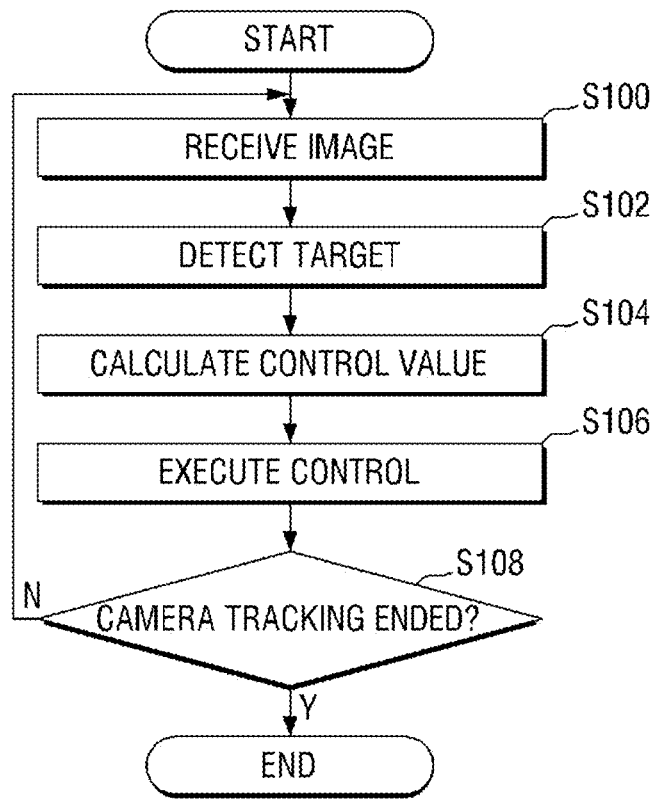
FIG. 9 is a flowchart illustrating an operation of the processor shown in FIG. 1 according to an exemplary embodiment.

FIG. 9 is a flowchart illustrating an operation of the processor 120 according to an exemplary embodiment.

Referring to FIG. 9, the processor 120 receives camera images in a frame unit from the camera (operation S100). A camera image currently being received is a first image, and a camera image subsequently being received is a second image.

Thereafter, the processor 120 detects the partial image including the object in the first image through an image detection process (operation S102).

Thereafter, the processor 120 generates a control value for positioning the specific point of the object corresponding to the specific coordinates of the partial image detected in operation S102 on the center coordinates of the second image which is captured by the camera subsequent to the first image (operation S104).

Thereafter, the processor 120 outputs the generated control value to the camera drive controller 130 to make the camera drive controller 130 change the image capturing area of the camera (operation S106).

Then, if the camera tracking to track the object in the monitoring area is ended, the above-described steps are all ended (operation S108).

Figure 10:
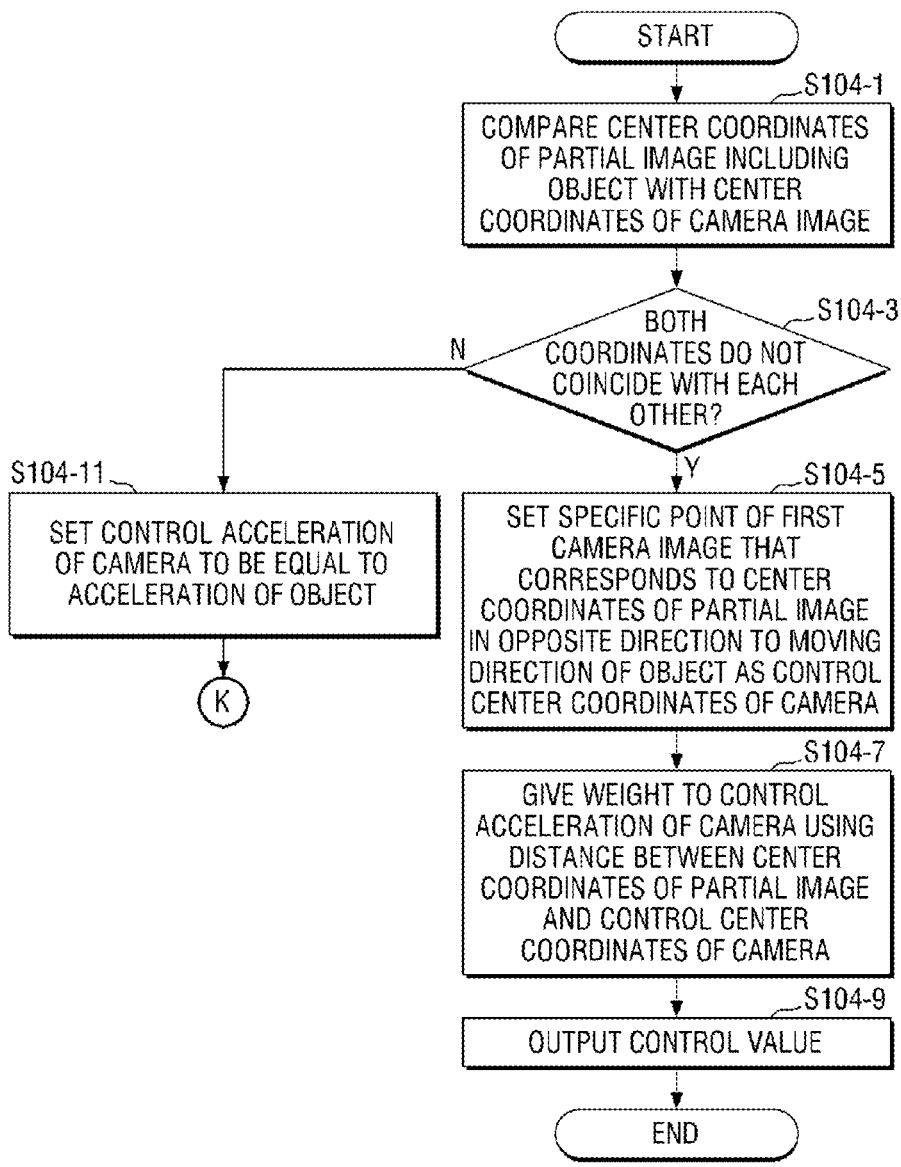
FIG. 10 is a flowchart of operation S104 shown in FIG. 9, according to an exemplary embodiment.

FIG. 10 is a flowchart illustrating of operation S104 shown in FIG. 9, according to an exemplary embodiment.

Referring to FIG. 10, the processor 120 compares the center coordinates of the first image with the center coordinates of the partial image including the object in the first image (operation S104-1).

Thereafter, the processor 120 determines whether both coordinates do not coincide with each other (operation S104-3).

If the center coordinates of the first image do not coincide with the center coordinates of the partial image including the object in the first image, the processor 120 sets the specific point of the first image corresponding to the center coordinates of the partial image in an opposite direction to the moving direction of the object as the control center coordinates of the camera (operation S104-5).

Thereafter, the processor 120 gives a weight to the control acceleration of the camera using the distance between the center coordinates of the partial image and the control center coordinates of the camera (operation S104-7).

Thereafter, the processor 120 generates the control value for controlling the driving of the camera based on the weight determined in operation S104-7, and outputs the generated control value to the camera drive controller 130 (operation S104-9).

If the center coordinates of the first image coincide with the center coordinates of the partial image including the object in the first image, the object has already been positioned in the center of the image screen, and thus the controller 120 maintains the control acceleration of the camera to be equal to the acceleration of the object (operation S104-11).

Figure 11:
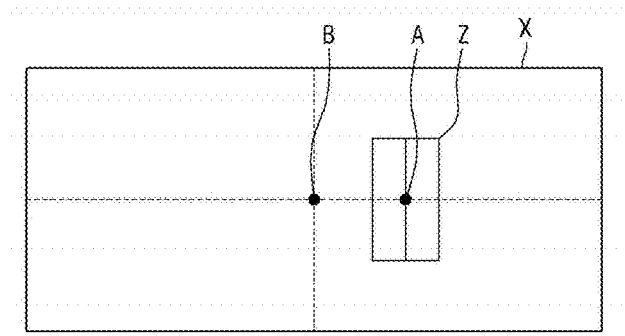
FIG. 11 is an exemplary diagram illustrating an image screen of an object which is in a standstill state or of which the direction is changed in the camera image of FIG. 4, according to an exemplary embodiment.

FIG. 11 is an exemplary diagram illustrating an image screen of an object which is in a standstill state or of which the direction is changed in the camera image of FIG. 4, according to an exemplary embodiment.

The processor 120 controls the movement of the camera by increasing the moving speed of the camera to make the object be always positioned in the camera image, and then performs a control so as to remove a screen vibration phenomenon that occurs in the center portion of the camera image due to inertia of movement of the camera, that is caused by a camera stop when the object being tracked is stopped or changes its direction.

For example, two control methods for the processor 120 to remove the screen vibration phenomenon may be performed.

As a first method, the processor 120 may predetermine a speed reduction pattern of the acceleration of the object, set a speed reduction section of the camera before a stop expectation point of the object, and execute a speed reduction process to minimize the inertia of movement of the camera in the set speed reduction section.

As a second method, if the speed reduction pattern of the acceleration of the object does not exist, the processor 120 may set the speed reduction section of the camera based on the stop point of the object during the stop or direction change of the object, and move the camera in a reverse direction at a predetermined reference speed as long as a distance between the center coordinates B of the camera image as illustrated in FIG. 11 and the specific point of the object.

The predetermined reference speed is a moving speed for positioning the object in the center of the screen after temporarily stopping the movement of the camera that tracks the object, and it is preferable, but not necessary, that the predetermined reference speed is a speed that minimizes the inertia of movement of the camera even if the camera is stopped after moving as long as the distance between the center coordinates B of the camera image and the specific point of the object.

Further, even if the control acceleration of the camera is abruptly changed to the acceleration of the object, the processor 120 can operate to remove the screen vibration phenomenon as described above.

Figure 12:
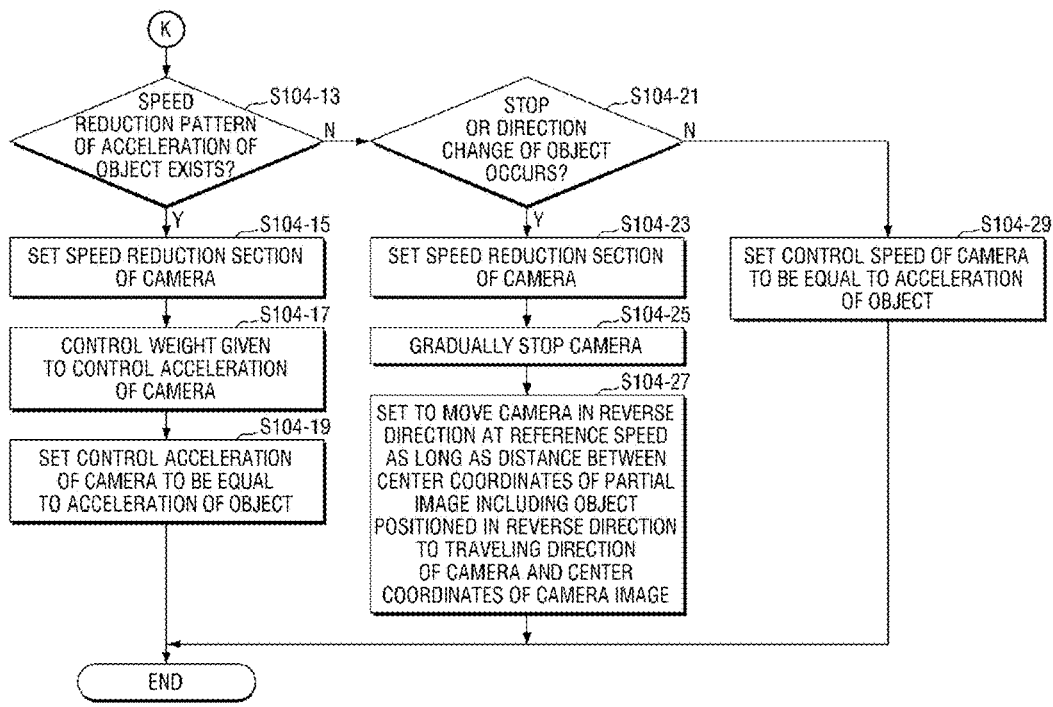
FIG. 12 is a flowchart illustrating a process subsequent to "K" shown in FIG. 10, according to an exemplary embodiment.

FIG. 12 is a flowchart illustrating a process subsequent to "K" shown in FIG. 10, according to an exemplary embodiment.

Referring to FIG. 12, the processor 120 determines whether a speed reduction pattern of the acceleration of the object exists during movement control of the camera to track the object (operation S104-13).

If it is determined that the speed reduction pattern of the acceleration of the object exists, the processor 120 sets a speed reduction section of the camera in the moving direction of the object (operation S104-15).

Thereafter, if the camera enters into the speed reduction section, the processor 120 removes a weight that is given to the control acceleration of the camera (operation S104-17).

Thereafter, the processor 120 sets the control acceleration of the camera to be equal to the acceleration of the object to minimize the inertia of movement of the camera (operation S104-19).

If it is determined that the speed reduction pattern of the acceleration of the object does not exist, the processor 120 determines whether the object is stopped or changes its direction (operation S104-21).

If it is determined that the object is stopped or changes its direction, the processor 120 sets the speed reduction section of the camera based on the stopping point of the object (operation S104-23).

Thereafter, the processor 120 controls the camera (not illustrated) to be gradually stopped in the speed reduction section of S104-23 (operation S104-25).

Thereafter, the processor 120 sets to move the camera in a reverse direction at a reference speed as long as the distance between the center coordinates of the partial image including the object positioned in a reverse direction to the traveling direction of the camera and the center coordinates of the camera image (operation S104-27).

Figure 13:
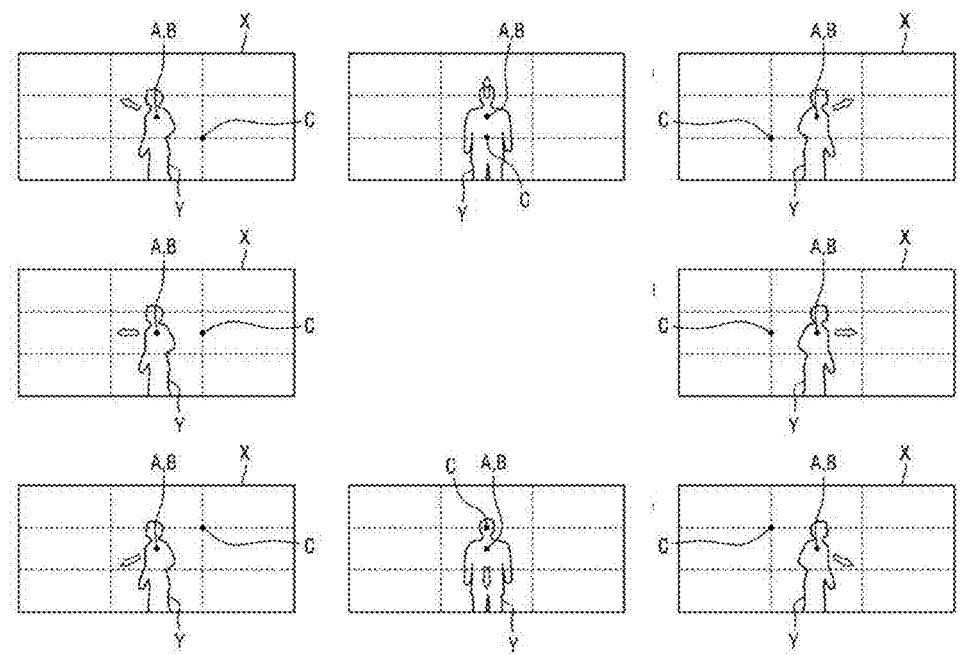
FIG. 13 is an exemplary diagram illustrating camera images captured by a camera, which are discriminated by control directions.

FIG. 13 is an exemplary diagram illustrating camera images captured by a camera, which are discriminated by control directions.

Referring to FIG. 13, the control center coordinates of the camera are changed with directivity according to the control direction of the camera to track the object.

Figure 14:
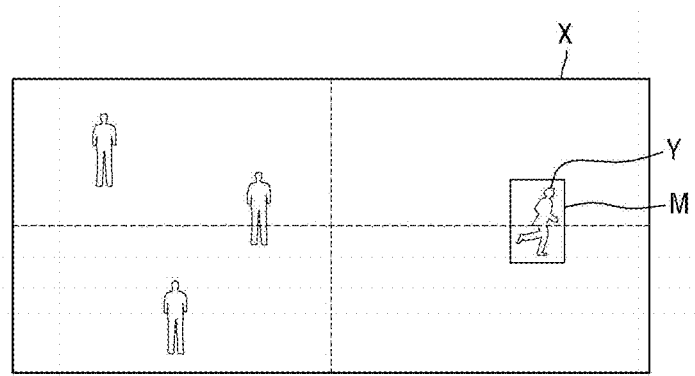
FIG. 14 is an exemplary diagram illustrating an example in which an object is specified if a plurality of objects exist in a camera image captured by a camera.

FIG. 14 is an exemplary diagram illustrating an example in which an object is specified if a plurality of objects exist in a camera image captured by a camera.

Referring to FIG. 14, a plurality of objects may exist in the first image. In this case, the processor 120 may set a moving object in the first image as a target.

Figure 15:
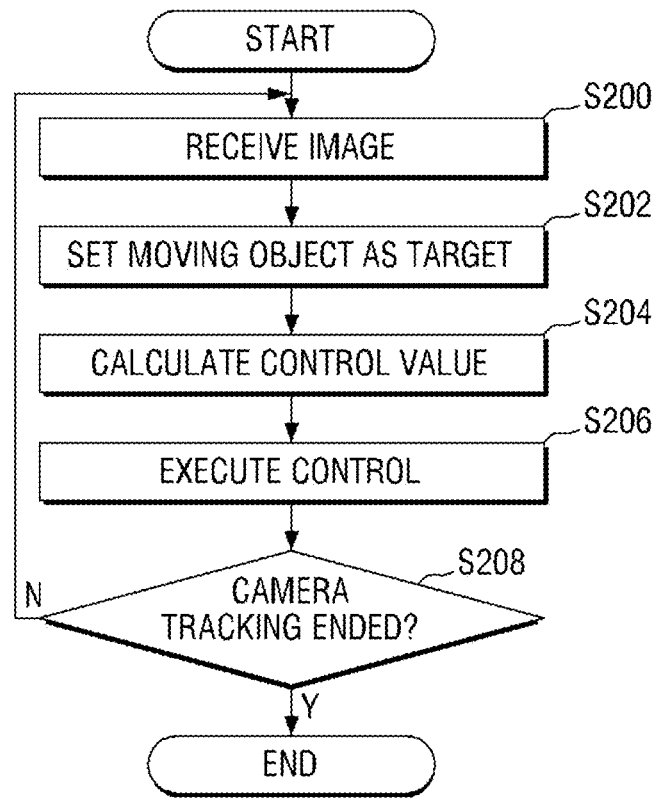
FIG. 15 is a flowchart illustrating an operation of the camera control apparatus of FIG. 1 according to an exemplary embodiment.

FIG. 15 is a flowchart illustrating an operation of the camera control apparatus 100 of FIG. 1 according to an exemplary embodiment.

Referring to FIG. 15, the processor 120 receives camera images in a frame unit from the camera (operation S200). A camera image currently being received is a first image, and a camera image subsequently being received is a second image.

Thereafter, the processor 120 detects the partial image including the object from the first image through an image detection process, and if a plurality of objects exist in the first image, the processor 120 sets a moving object as a target (operation S202).

Thereafter, the processor 120 generates a control value for positioning the specific point of the object corresponding to the specific coordinates of the partial image detected in operation S202 on the center coordinates of the second image which is captured by the camera subsequent to the first image (operation S204).

Thereafter, the processor 120 outputs the generated control value to the camera drive controller 130 to make the camera drive controller 130 change the image capturing area of the camera (operation S206).

Then, if the camera tracking to track the object in the monitoring area is ended, the above-described steps are all ended (operation S208).

Figure 16:
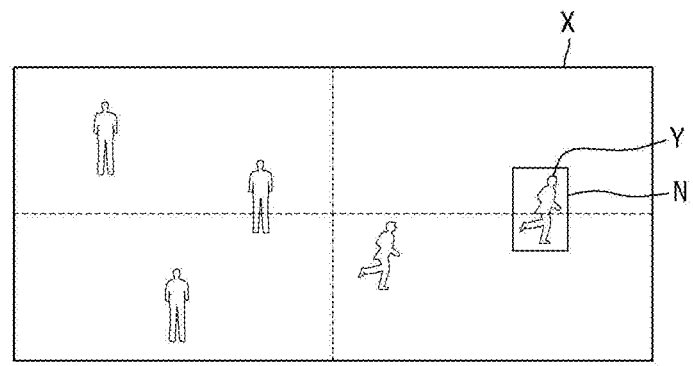
FIG. 16 is an exemplary diagram illustrating another example in which an object is specified if a plurality of objects exist in a camera image captured by a camera.

FIG. 16 is an exemplary diagram illustrating another example in which an object is specified if a plurality of objects exist in a camera image captured by a camera.

Referring to FIG. 16, if a plurality of objects exist in the first image and a plurality of objects are moving, the processor 120 may specify an object selected by a user or may select any one object of the plurality of objects according to a predetermined selection priority.

Figure 17:
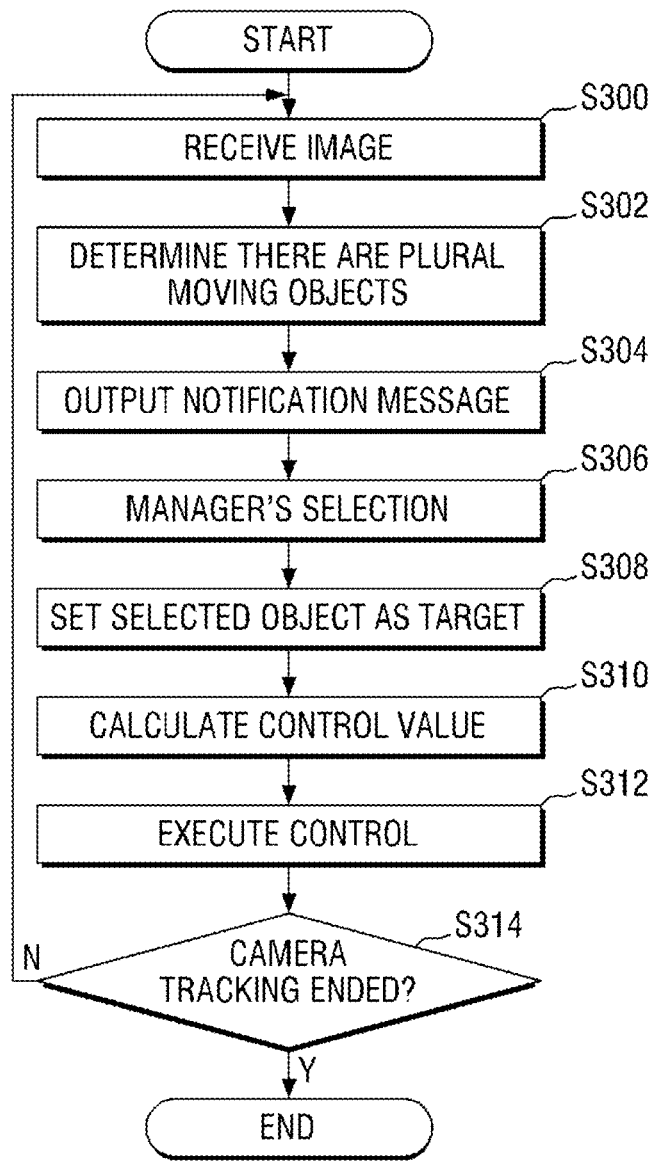
FIG. 17 is a flowchart illustrating an operation of the camera control apparatus according to an exemplary embodiment.

FIG. 17 is a flowchart illustrating an operation of the camera control apparatus 100 of FIG. 1 according to an exemplary embodiment.

Referring to FIG. 17, the processor 120 receives camera images in a frame unit from the camera (operation S300). A camera image currently being received is a first image, and a camera image subsequently being received is a second image.

Thereafter, the processor 120 detects the partial image including the object in the first image through an image detection process, and if a plurality of objects exist in the first image, the processor 120 outputs a notification message for notifying a user thereof (operations S302 to S304).

The user who is a manager selects any one of the plurality of objects in the first image (operation S306).

The processor 120 sets the object selected by the user as a target (operation S308).

Thereafter, the processor 120 generates a control value for positioning the specific point of the object corresponding to the specific coordinates of the partial image detected in operation 308 on the center coordinates of the second image which is captured by the camera subsequent to the first image (operation S310).

Thereafter, the processor 120 outputs the generated control value to the camera drive controller 130 to make the camera drive controller 130 change the image capturing area of the camera (operation S312).

Then, if the camera tracking to track the object in the monitoring area is ended, the above-described steps are all ended (operation S314).

Figure 18:
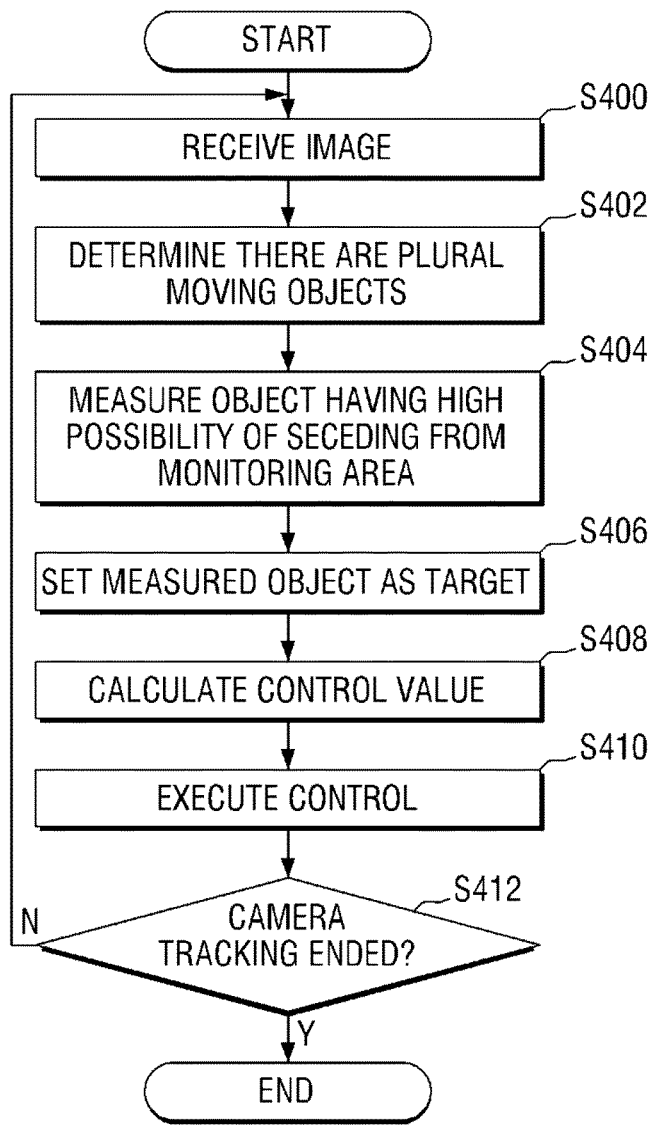
FIG. 18 is a flowchart illustrating an operation of the camera control apparatus according to an exemplary embodiment.

FIG. 18 is a flowchart illustrating an operation of the camera control apparatus 100 of FIG. 1 according to an exemplary embodiment.

Referring to FIG. 18, the processor 120 receives camera images in a frame unit from the camera (operation S400). A camera image currently being received is a first image, and a camera image subsequently being received is a second image.

Thereafter, the processor 120 detects the partial image including the object in the first image through an image detection process, and if a plurality of objects exist in the first image, the processor 120 may select an object having high possibility of seceding from the monitoring area as a priority object (operations S402 to S406).

Thereafter, the processor 120 generates a control value for positioning the specific point of the object corresponding to the specific coordinates of the partial image detected in operations 406 on the center coordinates of the second image which is captured by the camera subsequent to the first image (operation S408).

Thereafter, the processor 120 outputs the generated control value generated to the camera drive controller 130 to make the camera drive controller 130 change the image capturing area of the camera (operation S410).

Then, if the camera tracking to track the object in the monitoring area is ended, the above-described steps are all ended (operation S412).

Figure 19:
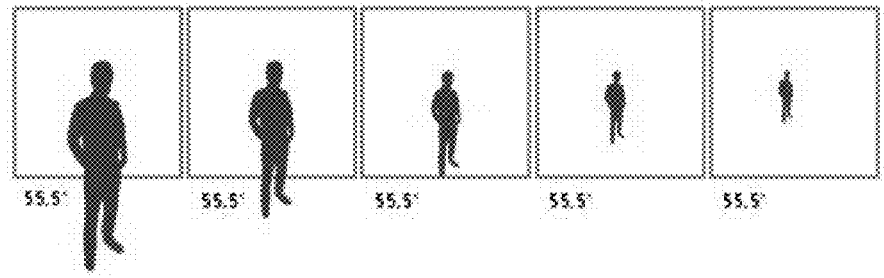
FIG. 19 is an exemplary diagram illustrating a case where objects recede in the distance in camera images captured by a camera.

FIG. 19 is an exemplary diagram illustrating a case where objects recede in the distance in camera images captured by a camera.

It is preferable, but not necessary, that the camera control apparatus 100 is configured so that objects included in camera images obtained by capturing a monitoring area are always positioned in the center of the camera images even if a zoom magnification is changed.

Referring to FIG. 19, if the zoom magnification is not changed in the case where objects recede in the distance in camera images that move from left to right, the fields of view of the respective camera images are kept as they are. In FIG. 19, the fields of view of the respective camera images are all 55.5°.

If zoom-in is performed in the camera, the field of view (FOV) with respect to the screen is narrowed, while if zoom-out is performed, the FOV with respect to the screen is widened.

The FOV is obtained by Equation 1 below.

$$FOV = 2 \arctan(0.5\ h/f),\qquad\text{[Equation 1]}$$

where, h is a sensor size, and f is a focal length.

Further, in the case of calculating the control value using only proportional-integral-derivative (PID) control, a problem may occur in a method using an accumulated average.

That is, if the same acceleration is applied if the size of the object appears the same as the zoom magnification is changed, the control is performed at an improper speed (e.g., too fast or too slow).

However, according to the exemplary embodiment, since the actual acceleration is not accumulatively averaged, but the accumulated average is calculated through movement of the center of the control on the screen, the change of the control of the zoom magnification is reflected in the FOV, and the acceleration per pixel is immediately changed.

That is, the change of the accumulated average of the acceleration according to the change of zoom magnification can be solved through the movement of the center of the control.

Figure 20:
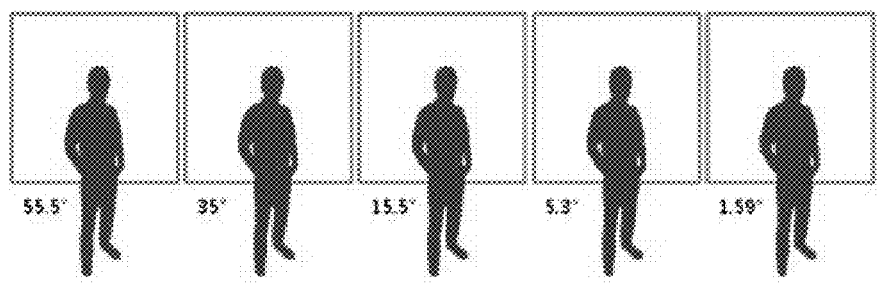
FIG. 20 is an exemplary diagram illustrating zoom-in camera images of FIG. 19.

FIG. 20 is an exemplary diagram illustrating zoom-in camera images of FIG. 19.

Referring to FIG. 20, respective camera images are images that are obtained by performing zoom-in or non-zoom-in with respect to the camera images of FIG. 19.

In FIG. 20, the second camera image corresponds to a case where the FOV is changed from 55.5° to 35° as a result of performing the zoom-in with respect to the second camera image of FIG. 19.

In FIG. 20, the fifth camera image corresponds to a case where the FOV is changed from 55.5° to 1.59° as a result of performing the zoom-in with respect to the fifth camera image of FIG. 19.

Figure 21A:
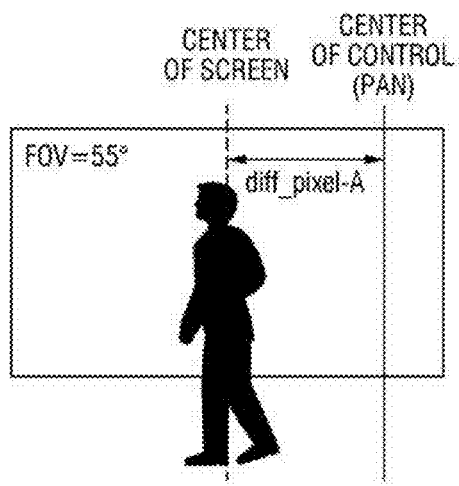
FIGS. 21A and 21B are exemplary diagrams illustrating respective images that are obtained by discriminating camera images of FIG. 4 according to fields of view.
Figure 21B:
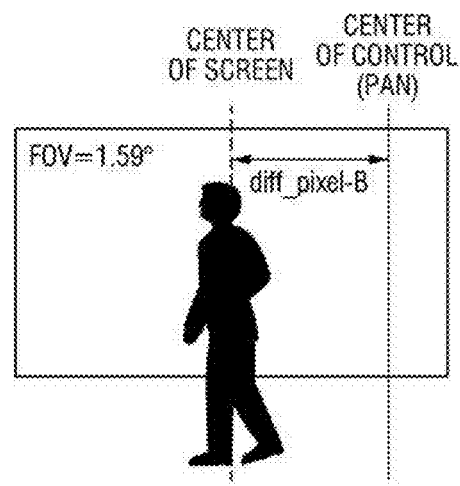

FIGS. 21A and 21B are exemplary diagrams illustrating respective images that are obtained by discriminating camera images of FIG. 4 according to fields of view.

FIG. 21A shows a camera image obtained through moving the camera image of FIG. 4 as it is, and the zoom magnification is not changed. That is, the FOV is 55°.

FIG. 21B shows a case where the zoom magnification is changed through performing of the zoom-in with respect to the camera image of FIG. 4. That is, the FOV is 1.59°.

Referring to FIGS. 21A and 21B, although the respective camera images have different FOV, the distances between the screen center and the control center are same. In this case, if the control speed includes the accumulated average, the speed change that is confirmed in the corresponding camera image becomes too fast when the zoom magnification is changed (e.g., the zoom-in is performed) as shown in FIG. 21B.

Accordingly, the control value calculation module makes the object in the camera image be always positioned in the center of the screen even if the zoom magnification is changed by generating a control value including the FOV value according to the zoom magnification applied to the camera image as a parameter to be applied to the weight change of the control acceleration for movement of the camera.

Figure 22:
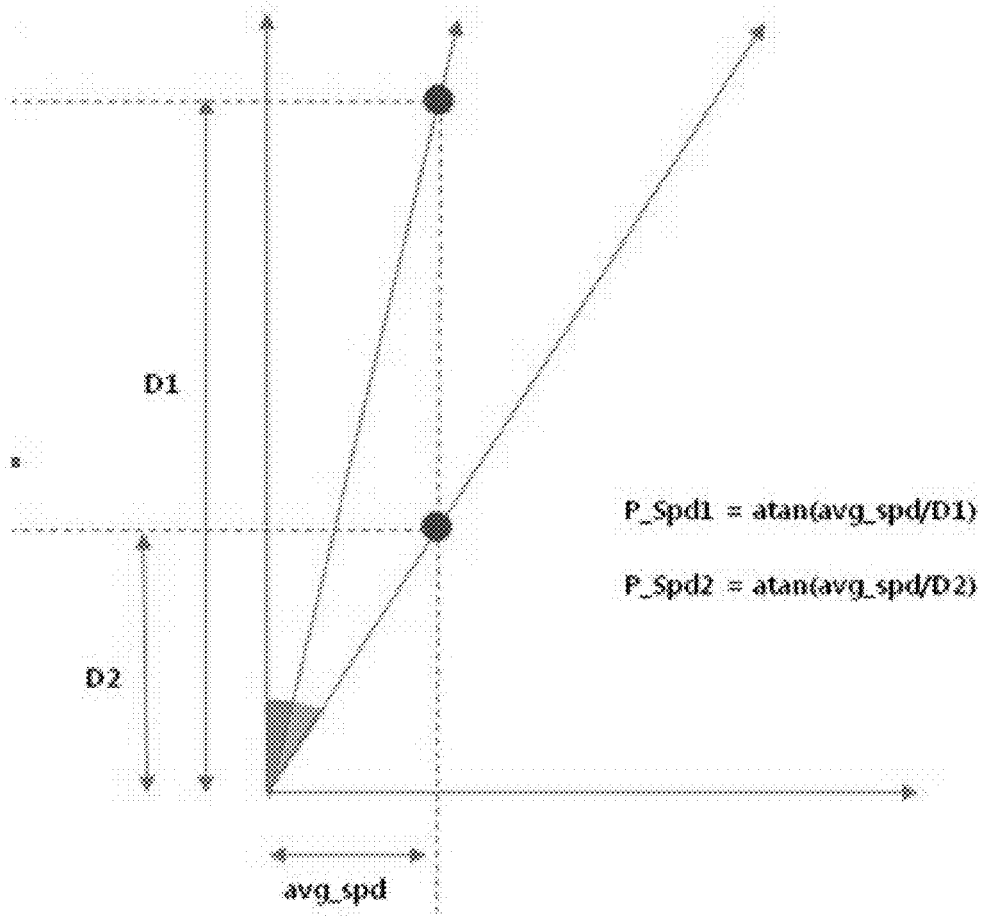
FIG. 22 is a graph illustrating an example of an acceleration change according to a zoom change.

FIG. 22 is a graph illustrating an example of an acceleration change according to a zoom change.

Referring to FIG. 22, the acceleration may be changed as in Equation 2 and Equation 3 below according to the zoom magnification.

$$P\_Spd1 = \arctan(avg\_spd/D1), \quad \text{[Equation 2]}$$

where P_Spd1 is an acceleration in the case of a first zoom magnification, avg_spd is an average moving speed of an object, and D1 is a first distance between a camera and an object.

$$P\_Spd2 = \arctan(avg\_spd/D2), \quad \text{[Equation 3]}$$

where P_Spd2 is an acceleration in the case of a second zoom magnification, avg_spd is an average moving speed of an object, and D2 is a second distance between a camera and an object.

For example, if D1 is the FOV corresponding to FIG. 21B and D2 is the FOV corresponding to FIG. 21A, the first acceleration P_Spd1 and the second acceleration P_Spd2 are calculated as described above. In this case, the speed change during the change of zoom magnification becomes great, and the control value calculation module generates the control value including the FOV value according to the zoom magnification applied to the camera image as a parameter to be applied to the weight change of the control acceleration for the movement of the camera.

For example, the control value calculation module can set the control acceleration corresponding to FIG. 21B, which is different from the control acceleration corresponding to FIG. 21A, using the deviation between the FOA corresponding to FIG. 21A and the FOA corresponding to FIG. 21B.

At least one of the components, elements, modules or units represented by a block as illustrated in FIGS. 1-3 may be embodied as various numbers of hardware, software and/or firmware structures that execute respective functions described above, according to an exemplary embodiment. For example, at least one of these components, elements, modules or units may use a direct circuit structure, such as a memory, processing, logic, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions. Also, at least one of these components, elements, modules or units may further include a processor such as a central processing unit (CPU) that performs the respective functions, a microprocessor, or the like. Further, although a bus is not illustrated in the above block diagrams, communication between the components, elements, modules or units may be performed through the bus.

According to the exemplary embodiments, since the object included in the camera image obtained by capturing an image of the monitoring area is always positioned in the center of the camera image, the inventive concept can be embodied with possibility of marketing and trade, and thus becomes industrially applicable.

Although the exemplary embodiments have been described for illustrative purposes, those skilled in the art will appreciate that various modifications, additions and substitutions are possible, without departing from the scope and spirit of the inventive concept as disclosed in the accompanying claims.

What is claimed is:

1. A camera control apparatus comprising:
    a processor configured to detect a partial image including an object from a first image of a camera, generate a control value for controlling a camera capturing area to position a specific point of the object corresponding to specific coordinates of the partial image on center coordinates of a second image of the camera which is captured by the camera subsequent to the first image, based on center coordinates of the partial image and center coordinates of the first image; and
    a camera drive controller configured to change the camera capturing area based on the control value output from the processor,
    wherein if the center coordinates of the partial image do not coincide with the center coordinates of the first image, the processor sets a specific point in the first image, which is opposite to the center coordinates of the partial image with respect to the center coordinates of the first image, as control center coordinates of the camera in the first image, calculates a distance between the center coordinates of the partial image and the control center coordinates of the camera in the first image, generates a weight, that makes a control acceleration for movement control of the camera exceed an acceleration of the object, based on the calculated distance, and gives the weight to a control acceleration of the camera, thereby generating the control value,
    wherein the processor is further configured to determine whether a speed reduction pattern of the acceleration of the object exists, and, if it is determined that the speed reduction pattern exists, set a camera moving speed reduction section in a moving direction of the object before a stop expectation point of the object, and
    wherein after setting the camera moving speed reduction section, the processor removes or changes the weight given to the control acceleration of the camera.

2. The camera control apparatus of claim 1, further comprising at least one memory configured to store program code,
    wherein the processor is further configured to be instructed by the program code, the program code comprising:
    an image reception code that causes the processor to receive a camera image in a frame unit;
    a target detection code that causes the processor to detect the partial image through a user's selection or a predetermined image detection process;
    a control value calculation code that causes the processor to determine the control center coordinates of the camera in the first image, and change a given weight for the control acceleration of the camera for changing the camera capturing area according to the distance between the center coordinates of the partial image and the control center coordinates of the camera in the first image, and generate the control value based on the changed weight; and
    a control execution code that causes the processor to output the control value to the camera drive controller.

3. The camera control apparatus of claim 2, further comprising an inputter to select the partial image.

4. The camera control apparatus of claim 1, wherein if it is determined that the speed reduction pattern does not exist the processor determines whether the object stops or changes the moving direction, and, if it is determined that the object stops or changes the moving direction, sets the camera speed reduction section based on a stop point of the object during the stop or the moving direction change of the object, determines whether the object is positioned at a specific point behind center coordinates of a third image, captured at a time of the stop or the moving direction change, with respect to the moving direction of the object, and, if it is determined that the object is positioned at the specific point behind the center coordinates of the image, controls the camera drive controller to move the camera in a direction opposite to the moving direction of the object at a predetermined reference speed as long as a distance between the center coordinates of the third image and center coordinates of the object in the third image.

5. The camera control apparatus of claim 2, wherein if a plurality of objects exist in the first image, the target detection code causes the processor to select any one of the plurality of objects by a user selection.

6. The camera control apparatus of claim 2, wherein if a plurality of objects exist in the first image, the target detection code causes the processor to automatically select any one of the plurality of objects based on a predetermined selection priority, in which an object having high possibility of seceding from a monitoring area is set as a priority object.

7. The camera control apparatus of claim 2, wherein the control value calculation code causes the processor to include parameters for applying a field of view (FOV) value corresponding to a zoom magnification of the second image to the weight change of the control acceleration.

8. A method of controlling a camera control apparatus comprising:
receiving a camera image in a frame unit from a camera;
detecting a partial image including an object from a first image of the camera;
generating a control value for controlling a camera capturing area to position a specific point of the object corresponding to specific coordinates of the partial image on center coordinates of a second image of the camera which is captured by the camera subsequent to the first image based on center coordinates of the partial image and center coordinates of the first image; and
changing the camera capturing area based on the generated control value,
wherein the generating the control value comprises if the center coordinates of the partial image do not coincide with the center coordinates of the first image, setting a specific point in the first image, which is opposite to the center coordinates of the partial image with respect to the center coordinates of the first image, as control center coordinates of the camera in the first image, calculating a distance between the center coordinates of the partial image and the control center coordinates of the camera in the first image, generating a weight, that makes a control acceleration for movement control of the camera exceed an acceleration of the object, based on the calculated distance, and giving the weight to a control acceleration of the camera, thereby generating the control value,
wherein the method further comprises:
determining whether a speed reduction pattern of the acceleration of the object exists during a movement control of the camera;
if it is determined that the speed reduction pattern exists, setting a camera moving speed reduction section in a moving direction of the object before a stop expectation point of the object; and
after setting the camera moving speed reduction section, removing or changing the weight given to the control acceleration of the camera.

9. The method of claim 8, wherein the detecting the partial image is performed through a user's selection or a predetermined image detection process.

10. The method of claim 8, wherein the generating the control value comprises:
comparing center coordinates of the partial image with center coordinates of the first image;
determining whether both coordinates do not coincide with each other;
if it is determined that both coordinates do not coincide with each other, determining the control center coordinates of the camera in the first image and changing a given weight for the control acceleration of the camera for changing the camera according to the distance between the center coordinates of the partial image and the control center coordinates of the camera in the first image.

11. The method of claim 10, wherein if it is determined that both coordinates coincide with each other, setting the control acceleration of the camera using a distance between the center coordinates of the partial image and the control center coordinates of the camera in the first image to be equal to an acceleration of the object using a distance between the center coordinates of the partial image and the center coordinates of the first image.

12. The method of claim 8, wherein if it is determined that the speed reduction pattern does not exist, determining whether the object stops or changes the moving direction, and, if it is determined that the object stops or changes the moving direction, setting the camera speed reduction section based on a stop point of the object during the stop or the moving direction change of the object, determining whether the object is positioned at a specific point behind center coordinates of a third image, captured at a time of the stop or the moving direction change, with respect to the moving direction of the object, and, if it is determined that the object is positioned at the specific point behind the center coordinates of the image, setting to move camera in a direction opposite to the moving direction of the object at a predetermined reference speed as long as a distance between the center coordinates of the third image and center coordinates of the object in the third image.

13. The method of claim 8, wherein if a plurality of objects exist in the first image, the detecting the partial image comprises selecting any one of the plurality of objects by a user selection.

14. The method of claim 8, wherein if a plurality of objects exist in the first image, the detecting the partial image comprises selecting any one of the plurality of objects based on a predetermined selection priority, in which an object having high possibility of seceding from a monitoring area is set as a priority object.

15. The method of claim 10, the generating the control value comprises generating the control value including parameters for applying a field of view (FOV) value corresponding to a zoom magnification of the second image to the weight change of the control acceleration.

16. A non-transitory computer readable medium having recorded thereon a program, which, when executed by a computer, performs the method of claim 8.

* * * * *